United States Patent [19]
Frank

[11] 3,891,420
[45] June 24, 1975

[54] SHAPING HEAT SOFTENED GLASS SHEETS BY ROLL FORMING

[75] Inventor: Robert G. Frank, Murrysville, Pa.

[73] Assignee: PPG Industries, Inc., Pittsburgh, Pa.

[22] Filed: May 2, 1974

[21] Appl. No.: 466,343

[52] U.S. Cl. .................. 65/106; 65/104; 65/245; 65/253; 65/273; 65/286
[51] Int. Cl. ............................................ C03b 23/02
[58] Field of Search ............ 65/101, 104, 106, 245, 65/253, 273, 275, 286

[56] References Cited
UNITED STATES PATENTS
3,701,644  10/1972  Frank .................................... 65/106

*Primary Examiner*—Arthur D. Kellogg
*Attorney, Agent, or Firm*—Edward I. Mates; Thomas F. Shanahan

[57] ABSTRACT

In forming heat-softened sheets by the roll forming method, continuously moving sheets of heat-softenable material, such as glass sheets, are conveyed continuously in a series along a conveyor into a roll forming station, where a pair of sets of rotating forming rolls move relatively toward one another to provide rolling engagement against the opposite major surfaces of each moving glass sheet in succession in spaced relation to the conveyor for sufficient time to shape the sheets. The rotating forming rolls are segmented into short lengths to reduce scuff marks caused by substantial differences in peripheral speed at different portions along the axial length of the rotating forming rolls. The present invention relates to a further improvement in roll forming apparatus that minimize still further the likelihood of producing scuff marks when sheets are shaped by roll forming.

4 Claims, 4 Drawing Figures

SHAPING HEAT SOFTENED GLASS SHEETS BY ROLL FORMING

BACKGROUND OF THE INVENTION

1. Field of the Invention

The need for curved glass sheets has increased tremendously in recent years, particularly with the increase in use of curved glass for windshields, sidelights and rear windows of automobiles. The problem of increasing the rate of production of shaped glass sheets on a mass production line has been recognized and the glass shaping art has developed new methods and apparatus that do not necessarily require sheets to be stopped at a shaping station as in U.S. Pat. No. 3,374,080 to Robert W. Wheeler or in U.S. Pat. No. 3,468,645 to Harold A. McMaster, et al. The roll forming method developed in response to this need is disclosed in U.S. Pat. No. 3,701,644 to Robert G. Frank. The present invention relates to an improvement in the roll forming apparatus of the aforesaid patent.

U.S. Pat. No. 3,701,644 to Robert G. Frank discloses a method and apparatus for shaping sheets of heat-softenable material, such as glass sheets, with opposed sets of rotating forming rolls. The sheets of glass or other softenable material are shaped while moving between the rotating rolls. This technique for shaping glass sheets has been identified by the term "roll forming."

Usually, the glass sheets to be shaped by roll forming are conveyed as a series of heat-softened sheets along a roller conveyor in a flat state into the roll forming station. The rolls of the roller conveyor are spaced longitudinally in a common upper tangential plane that defines the path of movement of the glass sheets into the roll forming station. According to the roll forming method, each heat-softened flat glass sheet is engaged between an upper set and a lower set of rotating forming rolls of complementary shape. Each set is carried by a movable roll housing. When each glass sheet in succession reaches a position wherein its entire length is between the forming rolls, the lower set of forming rolls lifts the glass sheet to a position above the conveyor where the sets of rotating forming rolls engage the opposite surface of the glass sheet for sufficient time to impress the shape of the forming rolls on the glass sheet as the latter passes between the sets of rotating forming rolls. The lower set of rotating forming rolls is then lowered to redeposit the shaped glass sheet on the conveyor.

The shaped sheet proceeds along the conveyor to a cooling or quenching station where the glass sheet is cooled at a rate sufficient to impart either a partial or a full temper or an anneal depending upon the rate of cooling. Cooling is usually provided by applying blasts of cold tempering medium, such as air, toward the upper and lower surfaces of the shaped galss sheet as the latter passes through the cooling station.

In any glass shaping method, it is essential that the glass be changed in shape without imparting scuff marks that results from the glass sheet surfaces rubbing against portions of the rotating forming rolls during the roll forming operation. U.S. Pat. No. 3,701,644 to Robert G. Frank provides segmented forming rolls in the roll forming apparatus and drives at least one segment of each pair at a peripheral speed that approximates the speed of glass sheets through the forming station. A single drive motor is used to rotate the drive shafts onto which the selected segments are fixed for rotation therewith for both the upper and lower set of forming rolls in the patented apparatus. The remaining roll forming segments of substantially different average diameter rotate freely to develop a peripheral speed equal to the speed of movement of the glass sheet through the roll forming apparatus.

While the arrangement for keying only certain segments to the rotating shafts depicted in the aforesaid Frank patent reduces the frequency of scuffing, from time to time as dirt becomes embedded into the roll forming apparatus between initially free running segments and their respective shafts, segments having an average diameter significantly different from the keyed segments frictionally engage the rotating shafts and rotate therewith at peripheral speeds significantly different from the speed of glass sheets through the roll forming apparatus to scuff the glass arriving at the roll forming station. This invention reduces the incidence of such scuffing.

SUMMARY OF THE INVENTION

While it is understood that the present invention is suitable to shape deformable sheets of any composition, it will be described in terms of shaping glass sheets by the roll forming method because it is especially beneficial in shaping glass sheets to very close tolerances and with minimum optical distortions and markings.

In order to assure that the roll forming apparatus as modified by the present invention produces glass sheets having a lesser frequency of surface marks resulting from scuffing than that resulting from the use of the roll forming apparatus originally disclosed in U.S. Pat. No. 3,701,644 to Robert G. Frank, means is provided to control the peripheral speed of at least one roll forming segment of each forming roll of one set of forming rolls at one peripheral speed and the peripheral speed of the corresponding forming roll segment of each corresponding forming roll of the other set of forming rolls with independent speed control means. When scuff marks are observed in glass sheets leaving the roll forming apparatus, a change in peripheral speed at which one set of rotating forming roll segments rotates compared to that of the other set, when made in the right direction, eliminates scuff marks. When the change in relative peripheral speed is made in the wrong direction, the scuff marks become more visible and the optical properties of the resulting glass sheets become worse.

Generally, in roll forming apparatus having an upper set of forming rolls of convex outer configuration along their axes of rotation and a lower set of forming rolls of concave outer configuration along their axes of rotation, the shafts about which the upper segmented forming rolls are mounted are adjusted to rotate at a slower angular velocity than the angular velocity at which the shafts about which the lower segmented forming rolls rotate. Since the different segments develop different peripheral speeds as they tend to rotate at the same angular velocity as that of the shafts on which they are mounted in the time interval between the roll forming of successive sheets, the relative rate of rotating the upper sets of shafts is so controlled relative to the rate at which the lower set of shafts is rotated that the absolute sum of the differences in average peripheral speeds of corresponding segments is kept sufficiently low to avoid observable scuff marks in the roll-formed sheet.

The present invention will be understood better in the light of a description of an illustrative embodiment and variations thereof that follows.

BRIEF DESCRIPTION OF THE DRAWINGS

In the drawings which form part of the description of an illustrative preferred embodiment and where like reference numbers are applied to like structural elements.

DESCRIPTION OF THE PREFERRED EMBODIMENT

Figure 1:
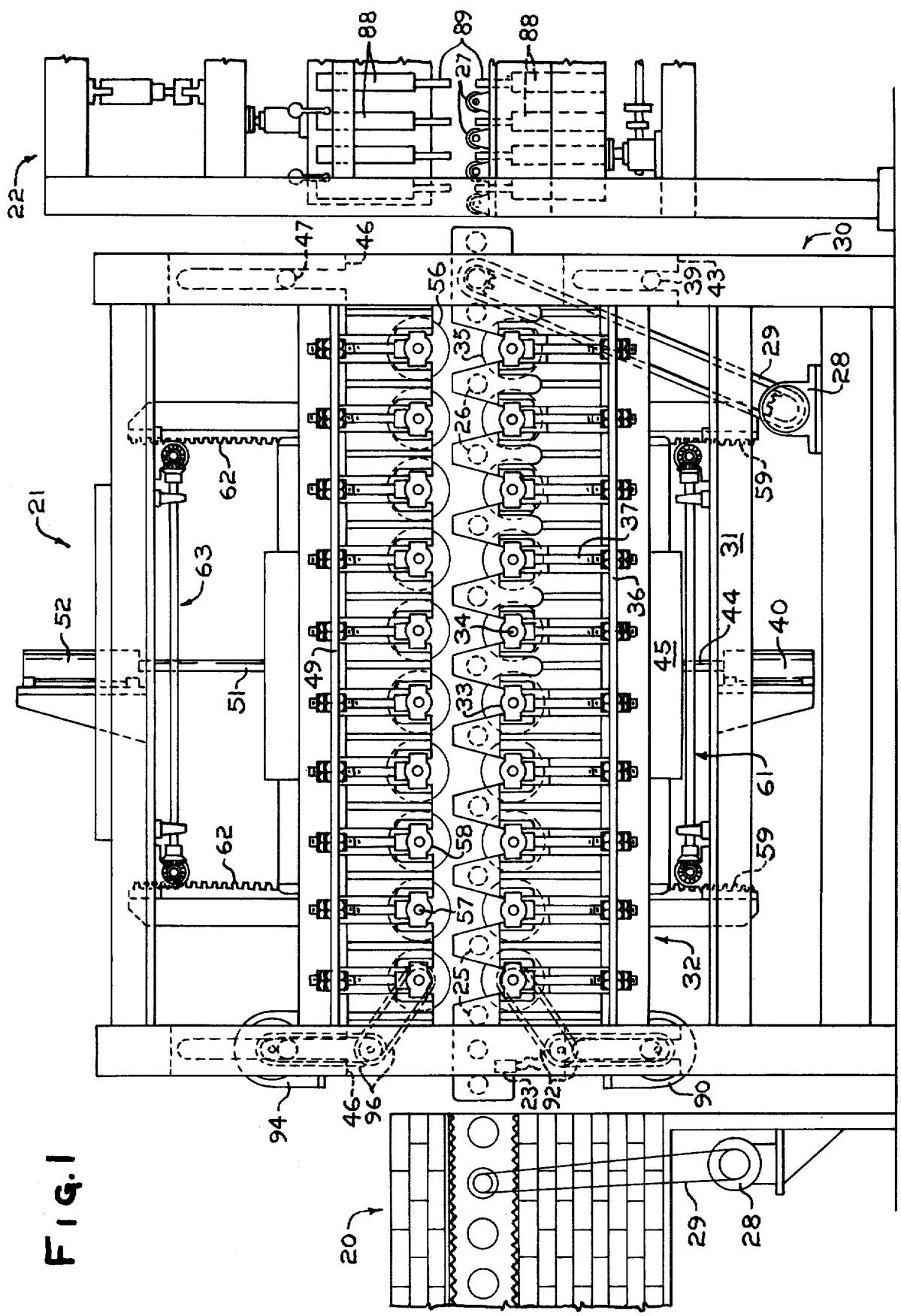
FIG. 1 is a longitudinal elevation of a portion of a preferred embodiment of apparatus incorporating a sheet forming station of the roll forming type conforming to the present invention.

Referring to the drawings, FIG. 1 discloses a side view of a roll forming apparatus of the type depicted in U.S. Pat. No. 3,701,644 to Robert G. Frank modified to incorporate a preferred embodiment of the present invention. The roll forming apparatus of the present invention comprises a tunnel-type heating furnace 20, a sheet forming station 21 of the roll-forming type, and a cooling station 22 of the type also depicted in the aforesaid Frank patent.

A glass sensing device 23 of the type well known in the art, such as an ultraviolet or infrared sensing device, is located between the exit of the furnace 20 and the entrance to the sheet forming station 21 to detect the passage of the trailing edge of a glass sheet to actuate operation of the sheet forming station 21 to perform its sheet forming function.

The conveyor system extends through the length of the furnace 20, the sheet forming station 21 and the cooling station 22. The conveyor system comprises a series of longitudinally spaced horizontally extending conveyor rolls 24 of 1¾ inch diameter disposed at 3 inch spacing throughout the length of the furnace for conveying a succession of glass sheets G therealong. The conveyor rolls 24 disposed in the furnace are preferably made of stainless steel and are of cylindrical configuration and rigid.

Additional conveyor rolls 25, also of rigid stainless steel shaft construction, each having an outer diameter of 1 inch and spaced on 7 inch centers, are located in the entrance end portion of the sheet forming station 21 and are covered with thin sleeves of fiber glass. Additional conveyor rolls 26 which are flexible to conform to the shape of shaped sheets are located in the exit end portion of the sheet forming station 21 and have the same outer diameters and roll to roll spacing as rigid conveyor rolls 25. The flexible conveyor rolls 26 are described and claimed in copending U.S. Pat. application Ser. No. 466,342, of Robert G. Frank, filed on the same date as the present application and the description of said rolls in said copending application is incorporated herein by reference. Additional conveyor rolls 27 of the adjustable type found suitable for use in the cooling station 22 and which are of the type described in either the aforesaid U.S. Pat. application Ser. No. 285,998, now U.S. Pat. No. 3,807,982 of Claassen and Canonaco or Ser. No. 285,999, now U.S. Pat. No. 3,807,546 of Canonaco are disposed in the cooling station 22, or at least in the entrance portion of the cooling station.

Figure 4:
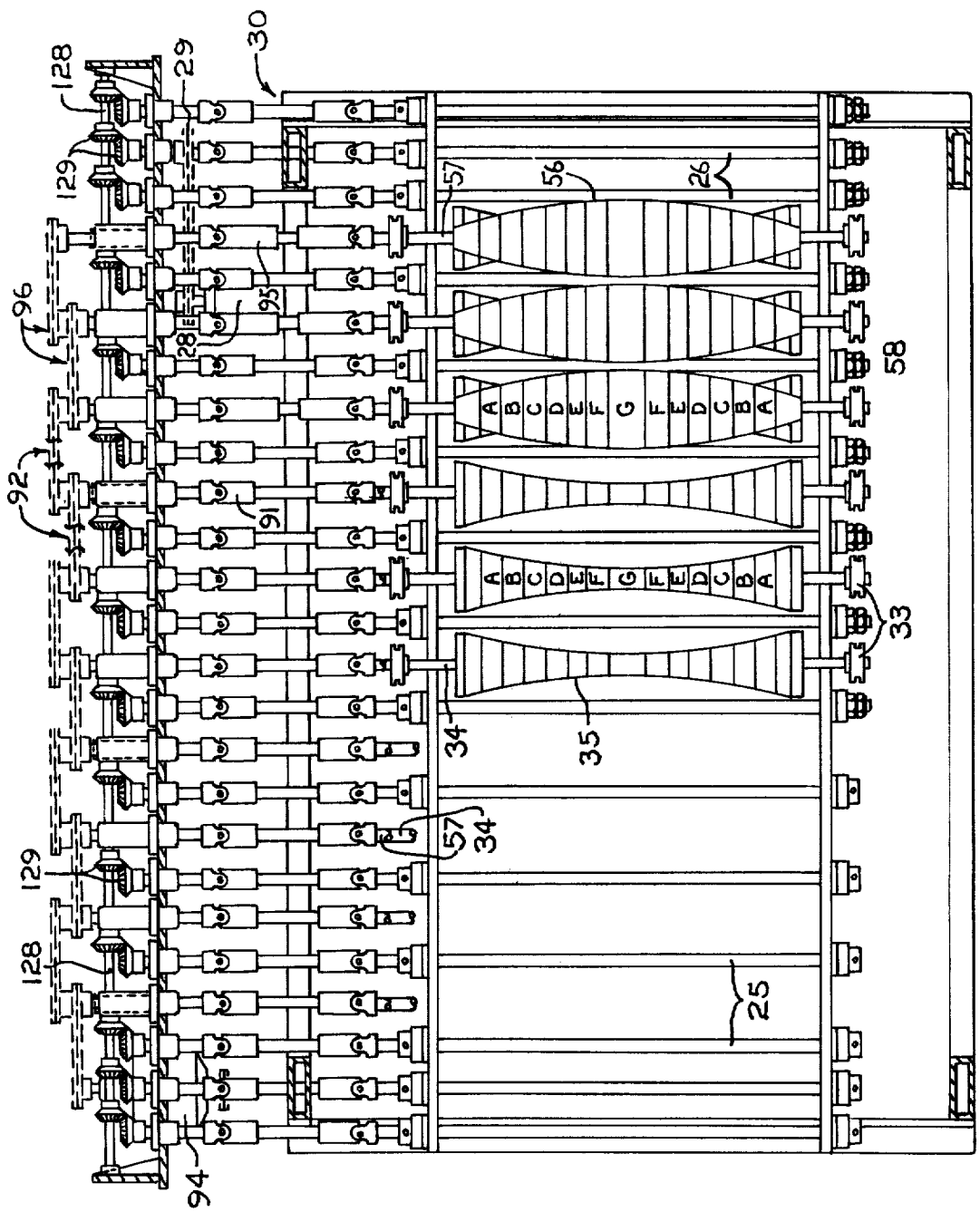
FIG. 4 is a fragmentary longitudinal sectional view of the sheet forming station of the roll forming apparatus of FIG. 1, partly in plan, and with portions removed to show other apparatus elements directly.

The conveyor rolls 24, 25, 26 and 27 form different sections of the conveyor system. Each conveyor section is driven off a drive motor 28 through a drive chain 29 that interconnects a sprocket on the drive motor shaft with a sprocket on a conveyor roll shaft. A separate longitudinally extending drive shaft 128 is provided with bevel gears 129, one to mesh with a bevel gear for each conveyor roll 24, 25, 26 and 27 to drive each conveyor roll of the conveyor section off the longitudinally extending drive shaft 128 for its respective conveyor section as shown in FIG. 4. If desired, certain conveyor rolls of one section may be disconnected by clutches from the motor driving one conveyor section for a driving connection to a motor driving another conveyor section, in a manner well known in the art. Also, the conveyor sections may be further subdivided, or the entire conveyor system may be made as one continuous section off a single drive motor and a single longitudinally extending drive shaft provided with bevel gears, as desired.

The furnace 20 comprises a tunnel-type passageway through which flat glass sheets are conveyed with their lower surface supported by successive rigid conveyor rolls 24. The furnace has heating elements 212 which may be electrical resistance heaters supported by the roof and the floor of the furnace so that the glass sheets may be irradiated as they are conveyed through the furnace to arrive at the furnace exit at a suitable temperature for shaping by roll forming and tempering.

The sheet forming station 21 of the present invention comprises an open reinforced frame structure 30 comprising a lower platform 31 which supports a vertically movable lower forming roll support housing 32 and an upper platform 41 which supports a vertically movable upper forming roll support housing 42. Both forming roll support housings are oriented in a horizontal plane parallel to the horizontal plane of support provided by the conveyor system. The lower forming roll support housing 32 comprises a pair of sets of vertical brackets 33. Each of the latter is located in spaced relation at 7 inch spacing along a row intersected by one of two spaced vertical planes that extend longitudinally of the conveyor system to receive one of a series of straight lower common shafts 34 near one or the other of its ends. The brackets 33 of each pair of brackets that support one of the lower common shafts 34 are located in a common vertical plane that extends normal to the first two vertical planes and parallel to the common vertical planes in which other pairs of brackets that support the other straight lower common shafts are located.

The brackets 33 are adjustably positioned in a vertical direction to support the series of common shafts 34 either in alignment with one another either in a horizontal line in a plane parallel to the plane of support provided by the upper tangent common to the horizontal conveyor rolls 24, 25, 26 and 27 of the conveyor system or in an oblique line or in adjustment along a curved line defined by the position of each bracket 33 along each of the two longitudinally extending, spaced, vertical planes or any combination of horizontal, oblique or curved lines as dictated by the nature of the shape to be imparted to the glass sheets being shaped.

Each of the lower common shafts 34 rotatably supports one of a series of lower segmented forming rolls 35. Each segment of the segmented forming rolls 34 is approximately two inches long axially, except for the centermost segments which are approximately four inches long. Each central shaping segment is flanked by an equal number of flanking shaping segments on either side thereof. The segments are depicted by letters A through G, with G being the center segment.

An apertured longitudinally extending horizontal angle member 36 is supported along each side of the lower forming roll support housing 32. Each aperture of each horizontal angle member 36 is vertically aligned below an internally threaded member extending downwardly from a corresponding one of the brackets 33. A series of threaded shafts 37 have their upper ends connected to the brackets 33 and their lower ends extending through a corresponding aperture of one or the other of the horizontal angle members 36. Suitable lock nuts are provided along each shaft 37 above and below a corresponding member 36 to adjust the axial position of the threaded shafts 37 relative to the horizontal angle member 36 so as to fix the position of each bracket 33 relative to the lower roll housing support structure 32. Each horizontal member 36 interconnects a pair of lower end plates 38. A roller 39 is attached to each end of each lower end plate 38.

The vertical position of each bracket 33, as determined by adjustment of its associated threaded shaft 37, controls the position of an end portion of a lower common shaft 34. The adjusted position of each pair of brackets 33 of each lower common shaft 34 establishes the orientation of the segmented forming rolls 35 that are mounted on the shafts 34. Each shaft 34 is straight to facilitate mounting and replacement of the segments of a forming roll of desired configuration thereon. It is thus a simple matter to remove one set of forming rolls conforming to one configuration and replace its segments with another set of forming rolls whose segments conform to another configuration whenever parts of a different configuration are to be produced.

The lower forming roll support housing 32 is rigidly attached to a vertically movable rod 44 of a lower piston 40. The latter is supported by the lower platform 31 of the open reinforced frame structure 30. A pair of lower vertical slotted plates 43 is carried by the frame structure 30 for receiving the rollers 39 attached to each end plate 38 of the lower forming roll support housing 32. A structural member 45 is attached to the upper end of the piston rod 44 and interconnects the end plates 38 which are also interconnected by the lower apertured angle members 36. This provides a rigid structure for the lower forming roll support housing 32 so that the set of lower forming rolls 35 supported by said lower forming roll support housing 32 moves in unison in response to actuation by the piston 40.

The open reinforced frame structure 30 also carries two pairs of upper vertically slotted plates 46 that receive upper guide rollers 47 fixed to the ends of upper end plates 48. The latter interconnect the opposite ends of a pair of upper, apertured, longitudinally extending, horizontal angle members 49 that form part of an upper forming roll support housing 42, and that have a reversed structure of those of the horizontal members 36. The upper end plates 48 are connected to an upper structural member 50, which is fixed to the free lower end of a rod 51 of an upper piston 52, which is extendable in a downward direction. A cylinder for the upper piston is supported on the upper platform 41 forming part of the reinforced frame structure 30.

In vertical planes intermediate the vertical planes occupied by the conveyor rolls 25 and 26 and in alignment with the vertical planes occupied by the lower set of segmented forming rolls 35, the upper forming roll support housing 42 supports a set of upper segmented forming rolls 56. Each upper segmented forming roll comprises a plurality of segments A through G mounted on a straight upper common shaft 57. The shape of each segment A through G of each upper forming roll 56 is complementary to the shape of the corresponding segment of its corresponding lower forming roll 35 depicted by a corresponding letter.

The vertical position of each of the upper segmented forming rolls 56 is adjustable in the manner similar to the adjustment provided for the lower segmented forming rolls 35. For example, each upper shaft 57 is received rotatably in one of a series of upper shaft brackets 58, each of which is a reversal of a bracket 33. The lower ends of externally threaded rods 60 are connected to internally threaded upper end portions of brackets 58 and their upper ends extend through apertures in one or the other of the upper, apertured, longitudinally extending, horizontal angle members 49 and are fixed in position to the latter through pairs of adjustment nuts for each threaded rod, one nut being below the angle member 49 and at least one nut mounted above the angle member 49 to determine the vertical position of each upper bracket 58 that determines the vertical position of each end portion of each upper common shaft 57.

Figure 2:
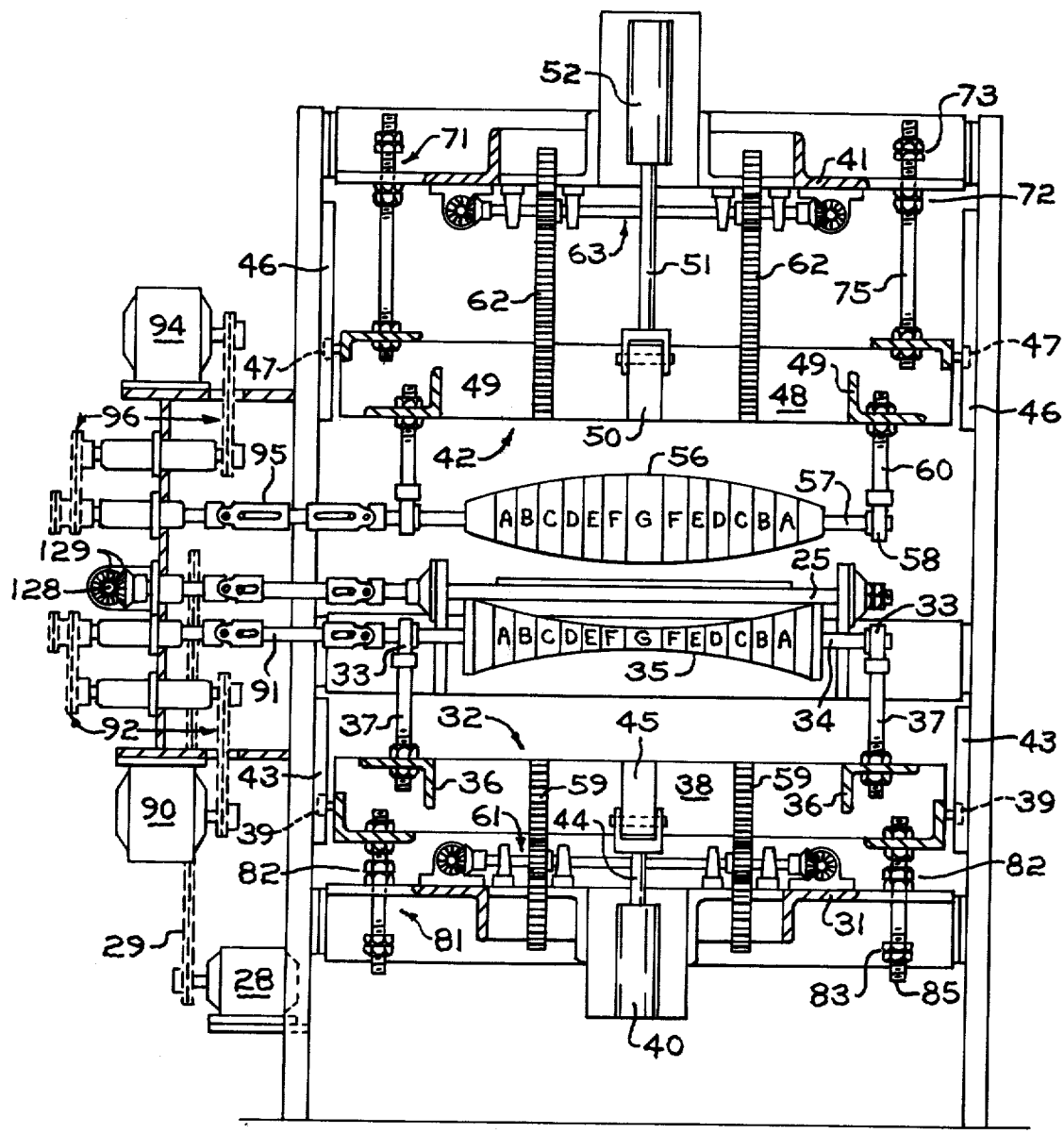
FIG. 2 is a transverse sectional view of the sheet forming station showing a pair of forming rolls in retracted position with a flat glass sheet entering the forming station for forming into a desired configuration.

As seen in FIG. 2, the segments of the lower segmented forming rolls 35 form a substantially continuous concave contour in the axial direction of the straight common shafts 34. This shape conforms to the shape desired about an axis parallel to the path the glass sheet takes through the sheet forming station 21 for an incremental portion of each glass sheet shaped by roll forming. The segments of the upper segmented forming rolls 56 have generally convex outer configurations that are complementary to the configurations of the lower forming roll segments they oppose.

Hence, if all the upper segmented rolls 56 have their shafts 57 in alignment in an upper horizontal plane and the lower segmented rolls 35 have their shafts aligned in a lower horizontal plane, when piston 40 is extended upwardly, the segmented rolls 35 are lifted in unison to positions above the horizontal plane occupied by the tangent common to the upper portion of the circumferences of the conveyor rolls 25 and 26 in the sheet forming station. Each vertically aligned pair of rotating upper and lower forming rolls engage different increments of a heat-softened glass sheet moving through a rollforming station when the piston 40 is extended upward a sufficient distance to lift the lower segmented forming rolls 35 into positions of rolling engagement against the undersurface of the glass sheet and forcing the upper surface of the glass sheet into rolling engagement against the upper set of forming rolls 56. Thus, the rotating rolls impose bending forces on different longitudinal increments of the traveling glass sheet simultaneously.

The composition of the roll segments is very important to insure porper operation of the roll forming apparatus with minimum glass breakage or glass marking. The material must have a low thermal conductivity to minimize thermal shock on the hot glass when the latter engages the relatively cold shaping rolls. The rolls must have a low coefficient of thermal expansion over a wide range of temperatures of approximately 600°F. from room temperature to an elevated temperature that the forming rolls attain on periodically contacting hot glass. They must be of a composition that does not react chemically with glass, that is durable over said wide temperature range, and is readily shaped or machined to complex contours. To meet the aforesaid requirements, the segments of the forming rolls 35 and 56 are composed of an asbestos cement of alumino-silica composition sold by Johns Manville under the trademark of TRANSITE.

In order to assure proper alignment between the upper roll support housing 42 and the lower roll support housing 32 when there is relative movement between the housings 32 and 42 or between each housing and the frame structure 30, each housing is provided with an alignment mechanism. The alignment mechanism for the lower roll housing 32 comprises four lower racks 59 extending downward from housing 32 to mesh with certain gears of a lower rectangular array 61 of lower horizontal connecting rods and gears connected to lower platform 31 forming part of the frame structure 30. A similar arrangement of upper racks 62 extends upward from the upper roll support housing 42 to mesh with certain gears of an upper rectangular array 63 of rods and gears affixed to upper platform 41 forming part of the frame structure 30 to align the upper roll housing 42.

The lower forming roll support housing 32 is provided with lower stop members 81 and the upper forming roll support housing 42 is provided with upper stop members 71. Each of the lower stop members 81 comprises a lower limit adjustment means 82 and an upper limit adjustment means 83 in the form of lock nuts adjustably mounted on one of a plurality of lower threaded shafts 85. Each of the latter is rigidly secured at its upper end to the lower forming roll support housing 32 and extends through an aperture in the lower platform 31 of the open reinforced frame structure 30 with lower limit adjustment means 82 disposed above the lower platform 31 and the upper limit adjustment means 83 disposed below the lower platform 31.

Each of the upper stop members 71 comprises an upper limit adjustment means 72 and a lower limit adjustment means 73 in the form of lock nuts adjustably mounted on one of a plurality of upper threaded shafts 75. The latter is rigidly secured at its lower end to the upper forming roll support housing 42 and extends through an aperture in an upper platform 76 of the open reinforced frame structure 30 with upper limit adjustment means 72 disposed below the upper platform 41 and the lower limit adjustment means 73 disposed above the upper platform 41.

The lower limit adjustment means 73 of the upper forming roll support housing 42 and the upper limit adjustment means 83 of the lower forming roll support housing 32 are adjusted according to the thickness of glass sheets undergoing roll forming so that the minimum spacing between corresponding shaping rolls in the direction of the glass sheet thickness exceeds the glass sheet thickness by a predetermined amount based on the tolerance permitted by the customer. This is usually between 0.01 inch and 0.05 inch, preferably 0.02 inch to 0.04 inch.

Figure 3:
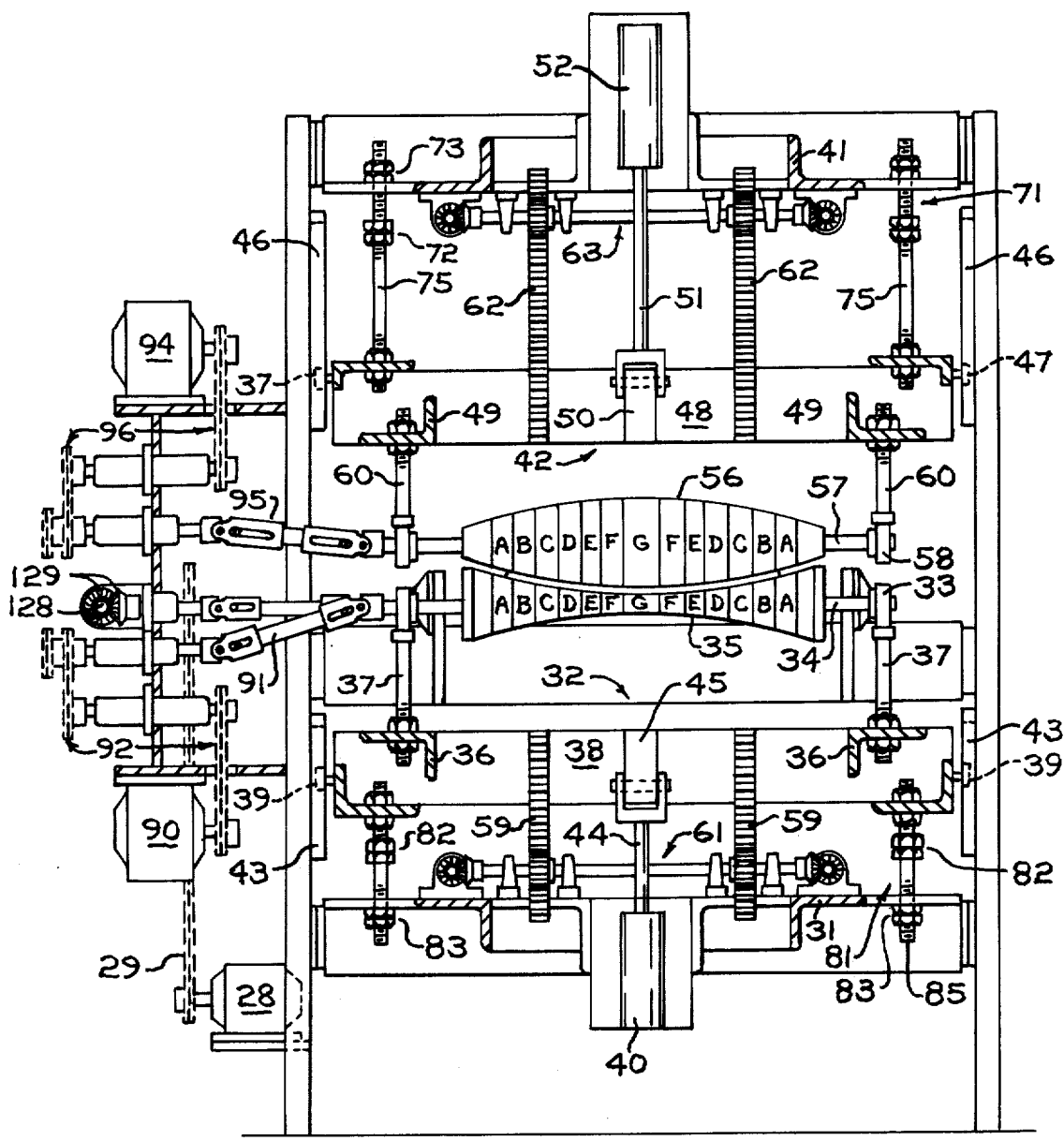
FIG. 3 is a view similar to FIG. 2 showing how the forming rolls of FIG. 2 engage a glass sheet during the process of roll forming.

FIGS. 2 and 3 show the roll forming apparatus in the respective positions occupied when the rotating forming rolls 35 and 56 are retracted from one another when a flat glass sheet is entering the roll forming station 21 (FIG. 2), and in the position occupied when they are engaging a glass sheet G that is being shaped (FIG. 3). While it is possible to operate the roll forming apparatus so that only the lower set of segmented forming rolls 35 are moved vertically toward and away from the corresponding upper set of segmented forming rolls 56 to shape the glass sheets, greater flexibility is provided when both the upper forming rolls 56 and the lower forming rolls 35 are provided with vertical movement. However, it is necessary that the lower forming rolls 35 retract in the flat glass receiving position to a position below the horizontal plane occupied by the common tangent to the upper surfaces of all of the conveyor rolls 25 and 26 in the sheet forming station 21, as depicted in FIG. 2, and that the lower forming rolls 35 occupy an upper position wherein the entire upper surfaces of the forming rolls 35 is above the common plane of the conveyor rolls 25 and 26, as depicted in FIG. 3.

The cooling station 22 may be of any type of glass tempering or heat-strengthening apparatus that is well known in the art. One type of cooling station that may be used is disclosed in U.S. Pat. No. 3,245,772 to James H. Cypher and Charles R. Davidson, Jr. Preferably, it comprises upper and lower nozzle boxes 88, each having a set of longitudinally spaced, elongated slot nozzle openings 89 extending transversely of the path defined by the portion of the conveyor system that extends through cooling station 22 that includes flexible conveyor rolls 27. The slot openings are preferably about 3/16 inch to ¼ inch wide and about 3 inches apart in each set and the nozzle openings of one set are about 5 inches from the nozzle openings of the other set, and aligned in vertical plane that intersect the spaces between adjacent conveyor rolls 27. The latter have an outer diameter of 2 inches or less at their axial ends and decrease in diameter toward their central portion as needed to conform to the shape of glass sheets being conveyed through the cooling station 22. The exact structure of the cooling station forms no part of the present invention and this description thereof is made as brief as possible because any cooling station used to temper glass sheets on a roller hearth may be used in conjunction with the present invention. Pressurized air from blowers (not shown) is supplied to the upper and lower nozzle boxes 88 for discharge through the nozzle openings 89 to cool bent glass sheets as they are conveyed through the cooling station 22.

If desired, exit doors of the type well known in the art may be included to intermittently close the exit slot openings of the furnace 20 and a similar door at the entrance of the cooling station 22 may be included to intermittently close the opening to the cooling station 22. This minimizes the exposure of the sheet forming station 21 to the hot atmosphere of the furnace 20 at one end and to the cold blasts of the cooling station 22 at the other end.

In order to minimize marking of the glass surface due to rubbing by portions of the shaping rolls whose peripheral velocity differs sufficiently from the speed of the glass sheet moving through the roll forming apparatus to cause observable rubbing marks, only selected segments of each segmented forming rolls 35 have been keyed to the lower shafts 34 to rotate therewith and the remaining segments of the lower forming rolls have been made freely rotatable relative to the lower shafts. Likewise, only selected segments of the upper segmented forming rolls 56 have been keyed to the upper shafts 57, while the remaining segments have been made freely rotatably thereon. In addition, low friction devices have been disposed between adjacent segments to minimize friction between adjacent segments. Despite these precautions, it has been impossible to eliminate scuff marks altogether, particularly when roll forming apparatus has been operating continuously without stopping to produce a particular pattern. Dirt and other undesirable material enters the forming rolls at the interfaces between adjacent segments and at the interfaces between the segments and the straight common shafts on which the segments are supported. Since the sheets treated by the apparatus are spaced longitudinally along the conveyor path from one another, the continuous rotation of the segments keyed to the rotating shafts is transmitted by friction to adjacent segments, so that by the time a succeeding sheet arrives at the roll forming station, the segments rotate at the same angular velocity and certain segments are slowed down while other segments are accelerated by engagement with the next successive glass sheet to enble the segments to rotate at peripheral speeds substantially equal to the peripheral speeds of the conveyor rolls 25 and 26. The present invention has eliminated scuff marks when they occurred in the shaped sheets by independently adjusting the peripheral speed of the upper driven segments and/or that of the lower driven segments keyed to the respective shafts 57 and 34.

Normally, when the scuff marks appear, they are present on the upper surface of the shaped glass sheets, particularly when the roll forming apparatus has its upper set of segmented forming rolls 56 provided with upper sheet engaging surfaces of convex configuration along the dimension parallel to the shaft on which the forming roll segments are mounted. Roll forming apparatus constructed according to U.S. Pat. No. 3,701,644 to Frank comprises two sets of segmented forming rolls at the sheet forming station. The axial length of the center segments of each segmented roll is approximately 4 inches and the axial length of each of the segments that flank the centermost segments is approximately 2 inches. Thus, segmented forming rolls having six segments flanking each end of the center segments are capable of shaping glass sheets having a width up to approximately 28 inches.

For most present commercial patterns, the third segment from each end of each set of rolls (segments C) have an average diameter most nearly equal to that of the corresponding segments C of the other set of rolls that they oppose during roll forming, although the width of the sheet and the radius of curvature to which the sheet will be bent about an axis parallel to the length of the conveyor system may determine that other corresponding segments are more closely matched in average diameter. In the equipment of U.S. Pat. No. 3,701,644 to Frank, the segments selected to be keyed to the upper and lower straight common shafts 57 and 34 were driven from a common drive at the same peripheral speed as one another and this peripheral speed was approximately equal to the speed of the sheets along the conveyor system.

According to the apparatus aspect of the present invention, the lower shafts 34 are connected to a lower shaft drive motor 90 through lower flexible coupling means 91 and a lower shaft drive system 92, while the upper shafts 57 are connected to an upper shaft drive motor 94 through upper flexible coupling means 95 and an upper shaft drive system 96. Both drive motors 90 and 94 are of the variable speed type.

The lower shaft drive motor 90 operates independently of the upper shaft drive motor 94 to rotate the lower shafts 34 in unison at any selected rotational speed that may be the same or different from the rotational speed of the upper shafts 57. In the aforementioned Frank patent, all the shafts rotated at the same rotational speed, which could be adjusted but not made different from one another.

Whenever, in the course of mass production operation, scuff marks begin to appear on the shaped sheets, the operator merely adjusts at least one of the motors 90 or 94 to change the rotational speed of its driven shafts 34 or 57. If the change in rotational speed is made in the wrong direction, the scuff marks become worse. If the change is proper in direction, the scuff marks become more faint and even disappear altogether.

In order to avoid having the operator guess which motor to change and in what direction to change its operating speed whenever scuff marks begin to appear, the following criteria are provided. For any given conveyor speed, the average peripheral speed of the lower segments keyed to the lower shafts 34, that is, the peripheral speed at the axial center of the keyed segments, is adjusted by adjusting the rotational speed at which the lower shafts 34 rotate in unison. After determining which segments to key to the lower shafts 34, and determining what number of revolutions per minute for the lower shafts 34 corresponds to a peripheral speed at the axial center of the keyed segments that approximates the linear speed of the sheets along the conveyor rolls 25 and 26, the peripheral speed corresponding to the rotational speed of the lower shafts 34 is calculated for the axial center of each of the segments supported by the lower shafts 34 from the center segment G outward to the segment supporting the sheet edge, assuming each segment is fixed to its corresponding shaft and rotates therewith.

Then, a rotational speed is selected for the upper shafts 57 on which the upper segmented forming rolls 56 of convex contour in the axial direction are mounted that is less than the rotational speed at which the lower shafts 34 rotate. Preferably, the rotational speed for the upper shafts should be such to produce a series of peripheral speeds for the axial centers of each of the segments of the upper forming rolls 56 such that the absolute sum of the differences in average peripheral speed of corresponding segments of opposing sets of rotating segmented forming rolls is kept sufficiently low to avoid observable scuff marks in the roll-formed sheet.

EXAMPLE I

Badly scuffed glass sheets resulted when glass sheets approximately 20 inches wide at their widest portion and tapering in width to 6 inches at their narrow end were conveyed at a conveyor line speed of 800 inches per minute through a roll forming station where they were roll formed to a 43 inch radius of curvature by engaging the sheets between segmented forming rolls having segments keyed to shafts rotating at 97 rpm to provide a peripheral speed for the axial center of the keyed segments of the upper forming rolls of 540 inches per minute and a peripheral speed of 800 inches per minute for the axial center of the lower keyed forming roll segments.

Sheets of this pattern produced by roll forming at different shaft speeds and different peripheral velocities for the axial centers of the upper and lower keyed segments had the following results provided in TABLE I.

TABLE I

STUDY OF HOW SCUFF IN GLASS SHEETS OF 43 INCH RADIUS IS AFFECTED BY CHANGE IN SHAFT SPEED AND PERIPHERAL VELOCITY

| ROLL | SHAFT SPEED (R.P.M.) | PERIPHERAL VELOCITY (INCHES PER MINUTE) | COMMENTS |
|---|---|---|---|
| Upper | 97 | 540 | Used original drive |
| Lower | 97 | 800 | system, both shafts at same shaft speed. Scuff bad |
| Upper | 144 | 820 | Scuff bad |
| Lower | 100 | 820 | |
| Upper | 146 | 820 | Scuff bad |
| Lower | 124 | 1000 | |
| Upper | 90 | 500 | Some light scuff |
| Lower | 100 | 820 | |
| Upper | 90 | 500 | Occasional light |
| Lower | 124 | 1000 | scuff, better |

This example showed that scuff could be improved by having the shafts rotate at different speeds and the keyed segments rotate at different peripheral velocities.

EXAMPLE II

Having established a peripheral velocity combination of 500 inches per minute for the upper keyed forming roll segment and 1000 inches per minute for the lower keyed forming roll segment for a pattern having a 43 inch radius of bend, the same peripheral velocity arrangement was tried for a pattern about 20 inches wide tapering to an 18 inch width conveyed through the roll forming station at a conveyor speed of 1000 inches per minute. The rotational speeds of the driving shafts was 39 rpm for the upper shafts and 79 rpm for the lower shafts. The sheets so produced had almost no observable scuff marks and were formed by engagement of keyed roll segments C and free running segments D, E, F and G.

Calculations following this successful experiment indicated that the peripheral speed of the segments would be as follows if they were all keyed to the respective shafts. The calculations are recorded in Table II, which follows Example III.

EXAMPLE III

Glass sheets apaproximately 20 ½ inches wide were roll formed to shapes having a radius of curvature of 75 inches. Initially, all the shafts were rotated at a common shaft speed of 80 rpm to produce a peripheral speed of 880 inches per minute for the lower keyed segment C, which was equal to the line speed of the conveyor system. After a while, scuff marks appeared. Then, the independent drive motors controlling the upper shafts was set to drive the upper shafts at a lower rotational speed. When the upper shaft speed was reduced to 54 rpm to produce a peripheral speed for the axial center of the upper keyed segment C of 600 inches per minute while the independent drive motor controlling the lower shafts was maintained at a lower shaft speed of 80 rpm to provide a peripheral speed for the axial center of the lower keyed segment C of 880 inches per minute as before, scuff marks were not observable.

TABLE II

| RADIUS OF CURVATURE (INCHES) | ROLL | PERIPHERAL SPEEDS (INCHES PER MINUTE) ROLL SEGMENT | | | | | SHAFT SPEED (RPM) | REMARKS |
|---|---|---|---|---|---|---|---|---|
| | | C | D | E | F | G | | |
| 37 | Upper | 500 | 580 | 645 | 677 | 709 | 39 | Independent |
| 37 | Lower | 1000 | 709 | 580 | 483 | 419 | 79 | control. No scuff |
| DIFFERENCE IN SPEED | | −500 | −129 | +65 | +194 | +290 | | |
| ABSOLUTE SUM OF DIFFERENCES | | | | | | | | −80 |
| 75 | Upper | 600 | 692 | 738 | 760 | 795 | 54 | Independent |
| 75 | Lower | 880 | 751 | 641 | 567 | 531 | 80 | control. No scuff |
| DIFFERENCE IN SPEED | | −280 | −59 | +97 | +193 | +264 | | |
| ABSOLUTE SUM OF DIFFERENCES | | | | | | | | +195 |
| 75 | Upper | 953 | 1100 | 1173 | 1208 | 1264 | 80 | All shafts at |
| 75 | Lower | 880 | 751 | 641 | 507 | 531 | 80 | common speed. Some scuff |
| DIFFERENCE IN SPEED | | +73 | +349 | +522 | +701 | +733 | | |
| ABSOLUTE SUM OF DIFFERENCES | | | | | | | | +2378 |

The calculations in Table II indicated that the presence or absence of scuff marks in the roll formed sheets could be controlled by independently controlling the rotational speed of the upper and lower shafts on which the respective forming roll segments are mounted.

Another feature of the prior art that is desirable for incorporation in the illustrative embodiment of the present invention is a moving glass locator device of the type covered by U.S. Pat. No. 3,701,643 of Robert G. Frank, the disclosure of which is incorporated herein by reference. The moving glass locator device is located at the exit portion of the furnace 20 and comprises a pair of carriages, each mounted for reciprocating movement in unison along parallel paths exterior to one or the other side of the exit portion of the furnace between an upstream position and a downstream position, a pair of glass sheet engaging members carried by each of said carriages in longitudinally spaced relation to one another and in laterally inward spaced relation to one or the other of said parallel paths, means to move each of said glass engaging members laterally inward from a retracted position to a glass edge engaging position in a direction transverse to said parallel paths, means to move said carriages in unison in the direction of glass travel at a preestablished conveyor speed as the glass engaging members move inward in unison to said glass engaging position, means to retract said glass engaging members to said retracted position after they have engaged the opposite side edges of the moving glass sheet to orient and align the latter properly, and means to return said carriages in unison to said upstream position. This patented device avoids improper sheet shaping in the sheet forming station due to misalignment or misorientation of the sheets entering the sheet forming station.

The form of the invention shown and described herein represents an illustrative preferred embodiment thereof and it is understood that various changes may be made without departing from the gist of the invention as defined in the claimed subject matter that follows.

I claim:

1. In the method of shaping sheets of heat-softenable material by roll forming wherein a series of heat-softened sheets is conveyed along a predetermined path and each sheet of said series in turn is moved continuously between a pair of sets of segmented forming rolls rotating about axes transverse to said path, each set comprising a series of segmented rolls spaced longitudinally along said path and adapted to engage one or the other major surfaces of said sheet and each roll in one of said sets corresponding to a roll of complementary curvature in the other of said sets, and providing said sets with relative motion toward one another while said sheet is moving therebetween to engage said moving sheet in sandwiching position between said sets of rotating forming rolls for sufficient time to impart the shape of said rolls onto said sheets, the improvement comprising independently controlling the rate of rotation of a preselected segment of the rolls of one set and independently controlling the rate of rotation of a corresponding preselected segment of the rolls of the other set in such a manner that the absolute sum of the differences in average peripheral speed of corresponding segments of opposing sets of rotating segmented forming rolls that engage the opposite surfaces of said glass sheet is kept sufficiently low to avoid observable scuff marks in the roll-formed sheet.

2. In the method according to claim 1, wherein one of said sets of segmented forming rolls has a convex contour along its axial direction and the other of said sets of segmented forming rolls has a complementary concave contour along its axial direction, the improvement wherein said driven segments of the segmented forming rolls having said convex contour are rotated at a lesser peripheral speed than the corresponding driven segments of said segmented forming rolls of said concave contour of the other corresponding segments that engage the sheet during said roll forming.

3. The improvement as in claim 2, wherein each sheet in turn is oriented to have an upper major surface and a lower major surface and said upper major surface is engaged with rotating shaping rolls having an outer convex configuration and said lower major surface is engaged with rotating shaping rolls having an outer concave configuration.

4. The improvement as in claim 1, wherein said sheets are composed of glass.

* * * * *

UNITED STATES PATENT OFFICE
CERTIFICATE OF CORRECTION

PATENT NO. : 3,891,420
DATED : June 24, 1975
INVENTOR(S) : Robert G. Frank

It is certified that error appears in the above-identified patent and that said Letters Patent are hereby corrected as shown below:

Column 1, line 56 "galss" should be --glass--.

Column 4, line 18 "and" should be --or--.

Column 5, line 9, "34" should be --35--.

Column 9, line 34 "enble" should be --enable--.

Column 12, line 15 "apaproximately" should be --approximately--.

Signed and Sealed this ninth Day of September 1975

[SEAL]

Attest:

RUTH C. MASON
Attesting Officer

C. MARSHALL DANN
Commissioner of Patents and Trademarks